United States Patent [19]

Lisenko

[11] Patent Number: 5,639,550

[45] Date of Patent: Jun. 17, 1997

[54] COMPOSITE PARTICULATE MATERIAL AND PROCESS FOR PREPARING SAME

[75] Inventor: Robert Lisenko, Hamden, Conn.

[73] Assignee: Specialty Media Corporation, Hamden, Conn.

[21] Appl. No.: 493,348

[22] Filed: Jun. 21, 1995

[51] Int. Cl.$^6$ .............................. B32B 5/16; B01D 24/00
[52] U.S. Cl. .......................... 428/404; 210/504; 210/506; 428/406; 428/407
[58] Field of Search ................... 428/403, 404, 428/406, 407; 210/638, 660, 679, 500.1, 500.26, 504, 506, 902, 912

[56] References Cited

U.S. PATENT DOCUMENTS

| | | | |
|---|---|---|---|
| 3,923,533 | 12/1975 | Hammel et al. | 106/54 |
| 4,178,270 | 12/1979 | Fujita et al. | 252/447 |
| 4,692,431 | 9/1987 | Weller | 502/417 |
| 5,019,311 | 5/1991 | Koslow | 264/122 |
| 5,049,309 | 9/1991 | Sakamoto et al. | 252/313.1 |
| 5,051,189 | 9/1991 | Farrah | 210/679 |
| 5,053,139 | 10/1991 | Dodwell et al. | 210/688 |
| 5,066,404 | 11/1991 | Komatsu et al. | 210/670 |
| 5,133,871 | 7/1992 | Levy | 210/688 |
| 5,277,931 | 1/1994 | Maglio et al. | 427/212 |

*Primary Examiner*—H. Thi Le
*Attorney, Agent, or Firm*—Bachman & LaPointe, P.C.

[57] ABSTRACT

A process for preparing a composite particulate material, comprising the steps of providing a particulate primary material having a primary softening temperature; providing a particulate support material having a support softening temperature; providing a particulate binder material having a softening temperature which is less than the primary softening temperature and the support softening temperature; mixing the primary material, the support material and the binder material so as to provide a substantially uniform mixture; and heating the mixture to a temperature greater than or equal to the softening temperature of the binder material and less than the primary softening temperature and the support softening temperature, whereby the binder material binds the primary material to the support material so as to provide a composite particulate material.

9 Claims, 1 Drawing Sheet ic material for use in such processes is disclosed in U.S. Pat. No. 5,277,931.

COMPOSITE PARTICULATE MATERIAL AND PROCESS FOR PREPARING SAME

BACKGROUND OF THE INVENTION

The invention relates to a process for preparing a composite particulate material, especially a composite particulate material for use in treating aqueous solutions and vapor phase systems, wherein the composite particulate material has increased effectiveness and resistance to attrition.

Various materials and processes are well known in the art for treating aqueous solutions and vapor phase systems, particularly for the removal of unwanted heavy metals such as lead and the like. A process for removal of heavy metals from aqueous systems is disclosed in U.S. Pat. No. 5,053,139, and a composite ion-exchange material for use in such processes is disclosed in U.S. Pat. No. 5,277,931.

U.S. Pat. No. 5,277,931 discloses the preparation of a composite ion-exchange material wherein porous particles are first sprayed with an aqueous basic material and subsequently sprayed with a concentrated aqueous acidic solution of a source of suitable metallic ions. This process for preparation is said to provide a composite material without significant deposit within pores of the support material and without encapsulating the particles of porous material. In practice, composite materials formed in accordance with the teachings of the '931 patent have been found to be undesirably susceptible to attrition. Specifically, large amounts of the primary material, which is typically the most expensive component of the final product, are lost during packaging and shipping of the product.

It is apparent that the need remains for a composite particulate material and a process for preparing same wherein the composite particulate material is resistant to attrition.

It is therefore the primary object of the present invention to provide a composite particulate material and a process for preparing same wherein the primary particles are substantially permanently bonded to the support material, thereby significantly reducing or eliminating the effects of attrition.

It is a further object of the present invention to provide a process for preparing a composite particulate material which is useful in treating aqueous solutions for the removal of heavy metals contained therein.

It is a still further object of the present invention to provide a composite particulate material having an excellent selectivity toward removal of undesirable heavy metals contained in aqueous solutions.

Other objects and advantages of the present invention will appear hereinbelow.

SUMMARY OF THE INVENTION

In accordance with the present invention, the foregoing objects and advantages are readily attained.

According to the invention, process is provided for preparing a composite particulate material, which process comprises the steps of providing a particulate primary material having a primary softening temperature; providing a particulate support material having a support softening temperature; providing a particulate binder material having a softening temperature which is less than the primary softening temperature and the support softening temperature; mixing the primary material, the support material and the binder material so as to provide a substantially uniform mixture; and heating the mixture to a temperature greater than or equal to the softening temperature of the binder material and less than the primary softening temperature and the support softening temperature, whereby the binder material binds the primary material to the support material so as to provide a composite particulate material.

According to a preferred embodiment of the invention, the particulate primary material has particle diameters of between about 1 to about 200 micrometers, the particulate support material has particle diameters of between about 1 to about 2,500 micrometers and the binder material has particle diameters of between about 1 to about 150 micrometers.

In accordance with another preferred embodiment of the invention, the process further includes the step of agitating the mixture during the heating step whereby the composite particulate material remains in a loose, non-continuous form.

In accordance with still another preferred embodiment of the invention, the heating and agitating steps are carried out in the absence of increased pressure so as to reduce or substantially eliminate deposit within the pores of the support material.

BRIEF DESCRIPTION OF THE DRAWINGS

A detailed description of the preferred embodiments of the invention follows with reference to the attached drawings, wherein.

DETAILED DESCRIPTION OF THE PREFERRED EMBODIMENTS

The invention relates to a process for preparing a composite particulate material, especially a composite particulate material for use in treating aqueous solutions and vapor phase systems for removal of heavy metal contaminants found therein.

In accordance with the invention, a process is provided for preparing composite particulate materials having enhanced resistance to attrition. According to the invention, a process is provided wherein a particulate primary material is substantially permanently bonded to a particulate support material in a manner which significantly reduces or eliminates loss of the primary material due to attrition. A binder material having a softening temperature lower than the primary and support materials is used in a heat process to provide the desired bonding as will be described in detail below.

A particular advantage of the present invention is that the desired composite particulate material is provided having increased resistance to attrition without substantial deposit within pores of the primary and support materials and without encapsulating the particles of primary material and support material, thereby providing a composite material having desirable properties, for example for treating aqueous solutions for removal of lead and other undesirable heavy metals.

Figure 2:
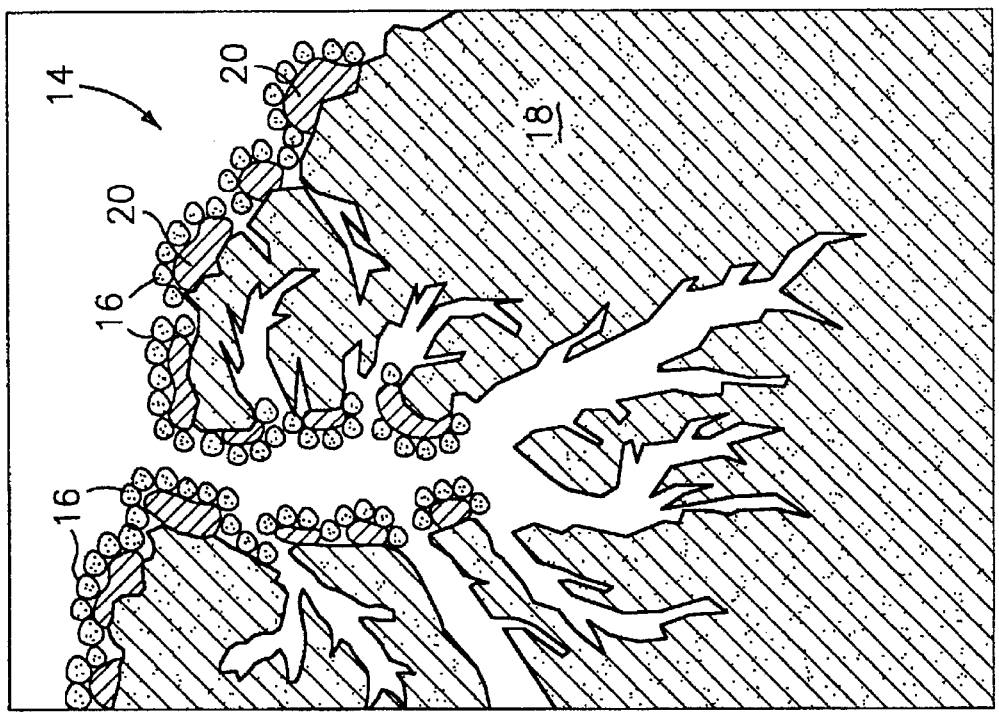
FIG. 2 is a drawing of a composite particulate material according to the invention.
Figure 1:
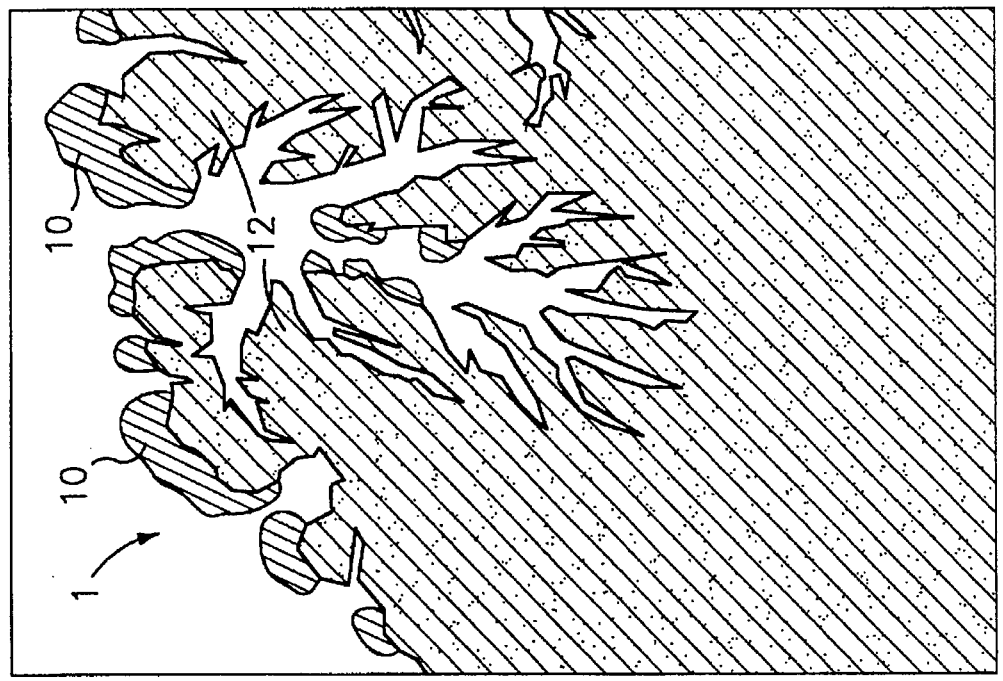
FIG. 1 is a drawing of a composite material according to the prior art.

With reference now to FIGS. 1 and 2, a composite particulate material according to the present invention will be further illustrated and compared to a conventional composite material. FIG. 1 shows a prior art composite material having a primary material 10 directly applied to a support material 12. The prior art composite material is typical of a composite material prepared in accordance with a spray deposition technique as used in the above mentioned U.S. Pat. No. 5,277,931. Composite material in accordance with FIG. 1 has been found to possess an unsatisfactory resistance to attrition and, specifically, such composite materials experience a large loss of primary material to attrition during shipping, handling and use. This loss of primary material adds to the cost of using such conventional materials.

Referring now to FIG. 2, the composite particulate material according to the invention is illustrated generally at 14. According to the invention, material 14 comprises a particulate primary material 16, a particulate support material 18 and a binder material 20 bonding particles of primary material 16 to particles of support material 18.

Binder material 20 is preferably substantially permanently bonded or adhered to support material 18 and primary material 16 so as to cover a relatively small portion of the surface area of support material 18 so that support material 18 is not masked by binder material 20.

PRIMARY MATERIAL

According to the invention, primary material 16 may preferably be selected from the group consisting of inorganic hydrated metal oxides, amorphous metal silicates, zeolite and mixtures thereof, more preferably inorganic hydrated titanium oxides or silicates, inorganic hydrated tin oxides or silicates and mixtures thereof, and most preferably titanium silicate, tin silicate and mixtures thereof.

The primary material of the present invention is preferably a material having a property desired in the final composite product such as ion exchange capacity with a particular undesirable component or constituent of a medium to be treated with the composite particulate material. Various primary materials are useful in accordance with the present invention for treating aqueous solutions to remove unwanted heavy metals such as lead, cadmium, zinc, chromium, arsenic, mercury and the like. Particularly preferred primary materials include titanium silicate and tin silicate for use in preparing a composite particulate material for removal of lead. Of course, numerous other materials or sorbent media may be used according to the invention to provide a desired affinity toward removal of a particular unwanted constituent.

In accordance with the invention, the primary material may preferably be micronized or powdered in form. The primary material is preferably provided having particle diameters of between about 1 to about 200 micrometers, and most preferably less than or equal to about 60 micrometers. Within the stated range, the primary material is preferably provided having a substantially uniform particle diameter.

SUPPORT MATERIAL

The support material may suitably be any of a wide variety of porous or non-porous materials and may also be selected to provide additional activity toward removal of unwanted constituents in a medium to be treated. Examples of suitable support materials include carbon, especially granular activated carbon; glass beads or bubbles; porous or non-porous volcanic media; plastic beads or pellets; plastic fibers; wood fibers; carbon fibers; ceramic media; fired or unfired clay; diatomaceous earth; metal particles; ferro magnetic material; silica gel; magnetic stainless steel; organic fiber; cellulose fiber; acrylic fiber; silicon carbide and the like. A particularly preferred support material is activated carbon, especially granular activated carbon.

The support material is preferably provided having particle diameters of about 1 to about 2500 micrometers. Within the stated range, the support material is preferably provided having substantially uniform particle diameters which are substantially greater in size than the particle diameters of the primary material.

BINDER MATERIAL

The binder material may be any of a wide variety of materials including crystalline thermoplastic polymer, thermoplastic polymer, crystalline polymer and mixtures thereof, preferably polyolefins, polyamides and mixtures thereof. Specific examples of preferred binder materials include polyethylene, polypropylene, ethylene vinyl acetate and mixtures thereof.

The binder material may be provided in particulate form having particle diameters of between about 1 to about 150 micrometers. Preferably, the binder particles are provided having particle diameters of less than or equal to about 30 micrometers. Within the stated range, the binder material is preferably provided having a substantially uniform particle size.

The relative softening temperature or Vicat softening point of the binder material with respect to the primary and support materials is preferably provided according to the invention so that the softening temperature of the binder material is significantly lower than the primary and support materials as will be discussed below. Typical binder materials have a softening temperature in the range of between about 250° F. to about 400° F. For low temperature applications, the binder material is preferably provided having a Vicat softening point of between about 150° F. to about 275° F., more preferably between about 170° F. to about 265° F.

PROCESS

The process for preparing the composite particulate material according to the invention will now be described. The composite particulate material is provided according to the invention by mixing the primary material, support material and binder material in selected amounts so as to provide a substantially uniform mixture, heating the mixture to a temperature sufficient to soften the binder material so that the particles of binder material begin to lose shape and become sufficiently viscous to adhere substantially all adjacent particles of primary and support materials, and either cooling the mixture or allowing the mixture to return to ambient temperature whereby the adhesion of the binder material between the primary material and the support material becomes substantially permanent, thereby providing a composite particulate material which is especially resistant to attrition losses, especially losses of the primary material which occur with conventionally prepared materials.

The primary, support and binder materials are preferably provided having softening temperatures such that the softening temperature of the binder material is significantly lower than the softening temperature of the primary and support materials. The softening temperature of the binder material is preferably sufficiently lower than the primary material softening temperature and the support material softening temperature that the mixture can be heated to a temperature in the range of the binder material softening temperature without adversely affecting the primary and support materials. For low temperature applications, the softening temperature or vicat softening point of the binder material may suitable be between about 150° F. to about 275° F., preferably between about 170° F. to about 265° F.

By providing a binder material having the specified softening temperature characteristics, the heating step can be carried out to the point where the binder material softens and begins to adhere to the primary and support materials as desired without adverse effect on the primary and support materials themselves.

In accordance with the invention, the primary, support and binder materials are preferably mixed in sufficient amounts such that the binder material is present in the mixture in an amount of at least about 5% by weight of the mixture, and preferably between about 5% to about 25% by weight of the mixture.

In further accordance with the invention, the mixture of primary, support and binder materials is preferably agitated or otherwise kept in motion during the heating step so as to provide a constant media motion state during the mixing and heating steps. Numerous apparatus may be utilized to provide such constant motion such as a heated drum, ribbon mixer, blender or extruder apparatus. This constant motion helps to prevent the formation of solid continuous structures other than those between individual particles of primary and support material, thereby providing a substantially non-continuous particulate final product as desired. The agitation or motion of the mixture is preferably continued beyond the heating step for at least a portion of the time required for the heated mixture to be cooled or allowed to return to ambient temperature.

In further accordance with the invention, the mixing and heating steps are preferably carried out at atmospheric pressure so as to reduce the entry or deposition of materials such as the binder material in the pore spaces of the primary and support materials, especially the support material, which pore spaces are believed to be particularly useful in providing the desired selectivity and activity of the final product for example in treating aqueous solutions for the removal of heavy metals. The mixing and heating steps according to the invention are therefore preferably carried out as close as possible to atmospheric pressure, i.e. in the absence of increased pressure, so as to reduce or avoid such deposition.

In accordance with the invention, the particles of primary material, support material and binder may be provided in various different sizes within the above-mentioned ranges. It is preferable that the primary, support and binder particles each be provided having a substantially uniform particle size within the respective range, and the support particles are preferably larger than the primary particles. The appropriate sizing of the particulate materials can be accomplished by milling, sieving, grinding or any other method.

A quantity of each of the primary, support and binder particles are thoroughly mixed so as to provide a substantially homogenous and uniform mixture of the particles. As set forth above, the binder particles are preferably provided so as to be present in the mixture as at least about 5% by weight of the mixture, preferably between about 5–25% by weight of the mixture. The primary and support particles make up the balance of the mixture, which can be modified in accordance with the desired characteristics of the end product.

Once the particles are thoroughly mixed, heat is applied to the mixture so as to raise the temperature of the mixture to a level which is higher than the softening temperature of the binder material and lower, preferably significantly lower, than the softening temperature of the primary and support materials. It is preferred that the mixture be heated to a temperature which is near the melting point of the binder when the binder material is a polyolefin or polyamide polymer group. Most preferably, the heating step is carried out so as to keep the temperature of the mixture within about 25° of the softening temperature of the binder material so that the binder material does not soften to the point where it readily flows and masks the internal pores of the primary and support materials.

During the heating step, the mixture is also preferably agitated in accordance with the invention so as to prevent the formation of a continuous structure. As set forth above, the heating and agitating steps are preferably carried out in accordance with the present invention at atmospheric pressure so as to avoid significant deposition of materials within the pore spaces of the primary and support materials.

After the mixture has been sufficiently heated as to provide the binder material in a substantially viscous state and in contact with adjacent particles of primary and support material, the mixture is allowed to return to ambient temperature, preferably while continuing agitation or mixing so as to further preclude the formation of continuous structures. During the cooling and/or returning to ambient temperature of the mixture, the binder material solidifies and thereby substantially permanently bonds the primary particles of material to the support particles as desired.

In accordance with the invention, it has been found that the composite particulate material formed in accordance with the process of the present invention has greatly improved resistance to attrition as compared to the material formulated in accordance with the spray process of U.S. Pat. No. 5,277,931.

According to an embodiment of the invention, at least one of the primary material and support material is preferably a ceramic ion exchange media having a desorption pore volume of between about 0.03 to about 0.25 cubic centimeters per gram so that the resulting composite particulate material possesses desirable activity and regeneration characteristics.

According to another embodiment of the invention, a particularly preferable composite particulate material may be prepared utilizing titanium oxides or silicates with polyolefin or polyamide binders, and with support particles composed of granular activated carbon, ceramic media, or fired clays.

According to still another embodiment of the invention, one or both of the primary and support materials as set forth above may be a zeolite material, preferably an aluminosilicate such as Class A zeolite and the like, which may be impregnated or otherwise provided with active media or ions such as calcium, potassium, sodium and the like, or any other specific material having activity toward a desired contaminant to be treated with the composite particulate material of the present invention. A wide range of zeolites are well known to those skilled in the art. Various types of zeolite having specific compositions and mole ratios may be useful in accordance with the invention to provide a desired characteristic of the end product.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A composite particulate material for removing heavy metals from aqueous solutions, comprising:

a particulate primary material selected from the group consisting of inorganic hydrated metal oxides, amorphous metal silicates, zeolite and mixtures thereof;

a particulate support material; and a binder material adhered to the primary material and to the support material for bonding the primary material to the support material whereby the composite particulate material has resistance to attrition.

2. A composite particulate material according to claim 1, wherein the primary material is selected from the group consisting of inorganic hydrated titanium oxides, inorganic hydrated tin oxides and mixtures thereof.

3. A composite particulate material according to claim 1, wherein the primary material comprises titanium silicate.

4. A composite particulate material according to claim 1, wherein the support material comprises granular activated carbon.

5. A composite particulate material according to claim 1, wherein at least one of the primary material and the support material is a ceramic ion exchange media having a desorption pore volume of between about 0.03 to about 0.25 cubic centimeters per gram.

6. A composite particulate material according to claim 1, wherein the binder material is selected from the group consisting of crystalline thermoplastic polymer, thermoplastic polymer, crystalline polymer and mixtures thereof.

7. A composite particulate material according to claim 1, wherein the binder material is selected from the group consisting of polyolefins, polyamides and mixtures thereof.

8. A composite particulate material according to claim 1, wherein the binder material is selected from the group consisting of polyethylene, polypropylene, ethylene vinyl acetate and mixtures thereof.

9. A composite particulate material according to claim 1, wherein the composite particulate material has enhanced resistance to attrition as compared to a material wfthout said binder.

* * * * *